No drawing.

UNITED STATES PATENT OFFICE.

KONRAD KUBIERSCHKY, OF BRUNSWICK, GERMANY.

PROCESS OF REMOVING CHLORIN FROM RAW BROMIN.

No. 881,806.  Specification of Letters Patent.  Patented March 10, 1908.

Application filed June 23, 1906. Serial No. 323,179.

*To all whom it may concern:*

Be it known that I, KONRAD KUBIERSCHKY, a subject of the German Emperor, and resident of Brunswick, German Empire, have invented a certain new and useful Improved Process of Removing Chlorin from Raw Bromin, of which the following is a specification.

My invention relates to a process of removing chlorin from raw bromin.

My process may be carried out in any suitable form of apparatus. I have shown in the drawing, by way of example, an apparatus which may be used therefor. Said drawing is a side elevation part in section, of an apparatus suitable for carrying out my invention.

The bromin produced in the German potash industry consists in raw state of bromin which has mixed with it more or less chlorin. Such raw bromin is placed on the market only in small quantities, while the greater part of it is refined, that is freed of the chlorin. This removing of the chlorin is obtained by redistilling the bromin after the addition of a watery solution of bromids. In this way the chlorin of the raw bromin forms chlorids with the bromids of the solution, so that pure bromin remains which can be separated by the distillation.

The raw bromin has furthermore been refined without distillation by simply shaking the raw bromin together with a solution of bromids. Based on this same principle is a process which is used in some plants, namely, leading the raw bromin immediately after it is produced through a solution of bromid and having it thus free of chlorin. All these processes above mentioned are based on chemically combining the chlorin of the raw bromin in some indirect way.

The present invention avoids chemical combining of the chlorin and thus obtains direct separation of chlorin from bromin so that the chlorin which is derived can be led back through the process and used for freeing further quantities of bromin. Physically, the raw bromin may be considered as a mixture of fluid chlorin and bromin. In heating this chlorin and bromin mixture, more chlorin than bromin escapes.

Simple fractional distillation of raw bromin causes a chlorin bromin mixture to escape which contains a large percentage of chlorin which decreases as the process goes on. (See *Muspratt Encyclopedia of Technical Chemistry*, 4th edition, volume 1, 1888, column 2009). Consequently, the boiling fluid will also become weaker in chlorin and in the end contain only pure bromin. This simple process has the disadvantage that considerable bromin escapes with the chlorin which can not be entirely avoided even by adding a dephlegmating substance.

By my invention raw bromin which has been cooled is permitted to drip down through a dripping tower where it is met by an ascending vapor rising from the boiler for receiving the purified bromin. Since the bromin vaporizes at a higher temperature than the chlorin, the bromin contained in the ascending vapors when it meets the cooled raw bromin is condensed, thereby giving up its latent heat to the raw bromin which causes therein a rise in temperature sufficient to vaporize the chlorin of the raw bromin, thus the chlorin is driven off and is allowed to escape at the top of the dripping tower, and the bromin runs off from the dripping tower into the boiler. This can be done either in continuous or intermittent process. In the intermittent process, a small quantity of pure bromin is heated in a boiler to its boiling point. The bromin vapors enter and rise in a dripping tower in which the raw bromin drips down. The bromin vapors continuously formed in the boiler rise in the dripping tower and as above described, drive the chlorin out of the raw bromin so that the chlorin mixed with a comparatively small quantity of bromin escapes upward, while the purified bromin is collected in the boiler. The chlorin vapor boils at a lower temperature than bromin, so that the bromin vapor that comes off the boiler first contains considerable chlorin, and the proportion of chlorin becomes constantly smaller since no more chlorin enters the boiler and finally pure bromin results in the boiler. After a certain quantity of purified bromin has been collected, it passes a cooling coil and is drained and packed in the well known manner.

The boiling point of the bromin in the boiler serves as an indication of its purity, as pure bromin has a higher boiling point than bromin which is mixed with chlorin. Therefore, the boiler should be provided with a thermometer of suitable accuracy for the control of the process.

In the continuous process, the boiler underneath the dripping tower is of but moderate dimensions, as the refined bromin will not be collected in large quantities but after collecting there, it will flow off continuously at the same rate as the newly refined bromin enters the boiler from the tower. This latter process may be applied with great advantage in plants where bromin is also produced in a continuous process as the refining process of the bromin can be directly connected with the producing process.

It may happen that the mixture of chlorin and bromin vapor rising into the upper part of the tower is not properly cooled off by the raw bromin entering the tower at the top, and that thus a chlorin vapor which if too rich in bromin will escape. In this case, it is advisable to provide for a temporary additional cooling of the chlorin and bromin vapor by a suitable cooling device. The bromin from the latter, then drips down together with the raw bromin in the tower.

In the drawing above referred to, 1 is a boiler in which a small quantity of raw bromin is heated to its boiling point in order to vaporize a part of it. The temperature in the boiler is indicated by the thermometer 2 which may be fastened in any suitable place in the pipe 3 through which the vapor may be led to the dripping tower 4 in which the vapor ascends. The raw bromin to be purified is supplied by the pipe 5 and passes through to a pipe 6 by way of a suitable cooling apparatus such as 7 mounted above the dripping tower 4 and connected with pipe 6 by the flexible tube 10. The raw bromin enters tower 4 through pipe 6 and the temperature may be measured in entering the tower by a thermometer 8 suitably fastened in pipe 6. The liquid raw bromin in dripping down in tower 4 meets the ascending vapor and is purified as above described.

The uncondensed vapor which is almost pure chlorin, ascends further in the dripping tower to the top thereof where it is discharged by discharge pipe 9 for further suitable use. The bromin refined in the tower 4 flows through pipe 3 into the boiler 1 where it is kept at the boiling point by means of the water bath 11, but pure bromin may be drawn off from the boiler 1 by the pipe 12 and led through cooler 13 of well known construction, from which it is discharged through the tube 14 a purified product ready for the market.

Whether the continuous or the intermittent process be employed, the general principle is the same, that is, the mixed vapors rise in the dripping tower and are met by the descending cold raw bromin whereupon the purification above described takes place. Therefore I do not wish to limit my invention to either of these processes exclusive of the other, and accordingly

I claim:

1. The herein described process of purifying raw bromin, which consists in dripping liquid raw bromin through ascending bromin vapor whereby the chlorin of the raw bromin is vaporized and the bromin vapor condensed.

2. The herein described process of purifying raw bromin, which consists in dripping liquid raw bromin and allowing same to be received in the boiler, whereby the same is vaporized and leading the ascending vapors upwardly through the dripping raw bromin whereby the chlorin of the raw bromin is vaporized and the bromin of the vapor condensed.

3. The herein described process of purifying raw bromin, which consists in dripping liquid raw bromin through an ascending bromin vapor whereby the chlorin of the liquid raw bromin is vaporized and the bromin of the vapor condensed, and passing the escaped vaporized chlorin through the condenser whereby condensation of the bromin contained in the escaped chlorin vapor takes place.

4. The herein described process of purifying raw bromin, which consists in fractionally distilling raw bromin and dripping cold raw bromin through the rising vapors therefrom.

KONRAD KUBIERSCHKY.

Witnesses:
PAUL KRAATZ,
M. SCHRADER.